United States Patent
Sun et al.

(10) Patent No.: US 10,994,465 B2
(45) Date of Patent: May 4, 2021

(54) RIGID CONNECTING DEVICE FOR CONNECTING THE UPPER AND LOWER SURFACES INSIDE AN OIL TANK AND PRODUCTION METHOD OF THE OIL TANK

(71) Applicant: YAPP Automotive Systems Co., Ltd., Yangzhou (CN)

(72) Inventors: Yan Sun, Yangzhou (CN); Lin Jiang, Yangzhou (CN); Liang Liu, Yangzhou (CN); Wenbin Hong, Yangzhou (CN); Hao Lv, Yangzhou (CN); Weidong Su, Yangzhou (CN); Xuehong Chen, Yangzhou (CN); Xiandou Wei, Yangzhou (CN); Gang Zhou, Yangzhou (CN); Dongming Wang, Yangzhou (CN)

(73) Assignee: YAPP AUTOMOTIVE SYSTEMS CO., LTD., Yangzhou (CN)

( * ) Notice: Subject to any disclaimer, the term of this patent is extended or adjusted under 35 U.S.C. 154(b) by 933 days.

(21) Appl. No.: 15/769,066

(22) PCT Filed: Nov. 6, 2015

(86) PCT No.: PCT/CN2015/093971
§ 371 (c)(1),
(2) Date: Apr. 17, 2018

(87) PCT Pub. No.: WO2016/078516
PCT Pub. Date: May 26, 2016

(65) Prior Publication Data
US 2018/0311880 A1    Nov. 1, 2018

(30) Foreign Application Priority Data

Nov. 18, 2014 (CN) .......................... 201410656620.0
Nov. 18, 2014 (CN) .......................... 201420691157.9

(51) Int. Cl.
*B60K 15/03* (2006.01)
*B29C 49/20* (2006.01)
(Continued)

(52) U.S. Cl.
CPC .............. *B29C 49/20* (2013.01); *B29C 49/18* (2013.01); *B29C 49/32* (2013.01); *B29C 49/48* (2013.01);
(Continued)

(58) Field of Classification Search
CPC .. B60K 2015/0344; B60K 2015/03493; B60K 15/03; B60K 15/03177; B65D 11/22; B65D 11/26
(Continued)

(56) References Cited

U.S. PATENT DOCUMENTS

2014/0305936 A1* 10/2014 Gebert .............. B29C 66/53245
220/4.13

FOREIGN PATENT DOCUMENTS

CN   202669472 U   1/2013
CN   103286939 A   9/2013
(Continued)

*Primary Examiner* — Stephen J Castellano
(74) *Attorney, Agent, or Firm* — Bayramoglu Law Offices LLC

(57) ABSTRACT

A rigid connecting device for connecting the upper and lower surfaces inside an oil tank includes a connecting rod. The upper and lower sides of the connecting rod are each provided with a connecting end surface. The connecting end surface is provided with material-passing hole. The outer surface of the rigid connecting device is covered with high-density polyethylene. The upper and lower surfaces of the oil tank are connected by a connecting rod, and such arrangement is locally applied to areas where the rigidity of the oil tank is poor, so there are more effective space. The part of the rigid connecting rod contacting with the oil fuel (Continued)

is made of high-density polyethylene, so the requirements of strength and anti-corrosion can be satisfied.

19 Claims, 13 Drawing Sheets

(51) Int. Cl.
| | |
|---|---|
| *B29C 49/18* | (2006.01) |
| *B60K 15/073* | (2006.01) |
| *B29C 49/32* | (2006.01) |
| *B29C 49/48* | (2006.01) |
| *B29C 51/20* | (2006.01) |
| *B29C 51/12* | (2006.01) |
| *F16B 2/20* | (2006.01) |
| *B29C 51/26* | (2006.01) |
| *B29C 51/10* | (2006.01) |
| *B29C 51/02* | (2006.01) |
| *B29C 51/08* | (2006.01) |
| *B29C 49/04* | (2006.01) |
| *B29C 51/30* | (2006.01) |
| *B65D 6/34* | (2006.01) |
| *B29K 23/00* | (2006.01) |
| *B29K 623/00* | (2006.01) |
| *B29L 31/00* | (2006.01) |

(52) U.S. Cl.
CPC .............. *B29C 51/12* (2013.01); *B29C 51/20* (2013.01); *B60K 15/03* (2013.01); *B60K 15/03177* (2013.01); *B60K 15/073* (2013.01); *F16B 2/20* (2013.01); *B29C 49/04* (2013.01); *B29C 51/02* (2013.01); *B29C 51/082* (2013.01); *B29C 51/105* (2013.01); *B29C 51/267* (2013.01); *B29C 51/30* (2013.01); *B29C 2049/2013* (2013.01); *B29K 2023/065* (2013.01); *B29K 2623/065* (2013.01); *B29L 2031/7172* (2013.01); *B60K 2015/03032* (2013.01); *B60K 2015/0344* (2013.01); *B60K 2015/03493* (2013.01); *B65D 11/22* (2013.01); *B65D 11/26* (2013.01)

(58) Field of Classification Search
USPC .................................................. 220/653, 562
See application file for complete search history.

(56) References Cited

FOREIGN PATENT DOCUMENTS

| | | |
|---|---|---|
| CN | 103925128 A | 7/2014 |
| CN | 104477027 A | 4/2015 |
| CN | 204354817 U | 5/2015 |
| EP | 0633422 A1 | 1/1995 |
| WO | 9857095 A1 | 12/1998 |

* cited by examiner

RIGID CONNECTING DEVICE FOR CONNECTING THE UPPER AND LOWER SURFACES INSIDE AN OIL TANK AND PRODUCTION METHOD OF THE OIL TANK

CROSS REFERENCE TO RELATED APPLICATIONS

This application is the national phase entry of International Application PCT/CN2015/093971, filed on Nov. 6, 2015 which is based upon and claims priority to Chinese Patent Application No. 201410656620.0, filed on Nov. 18, 2014, and Chinese Patent Application No. 201420691157.9 filed on Nov. 18, 2014, the entire contents of which are incorporated herein by reference.

TECHNICAL FIELD

The present invention relates to a rigid connector, particularly to a rigid connector for connecting the upper and lower surfaces inside an oil tank and a production method of the oil tank, which belongs to the technical field of automobile parts.

BACKGROUND

Compared with metallic oil fuel tanks, automotive plastic oil fuel tanks have outstanding advantages, especially for having light weight, higher degree of freedom in product appearance design, and in aspect of performances such as anti-corrosion and anti-impact properties etc. However, the structure of HDPE (i.e. sheet-like material of high density polyethylene) which is commonly used in plastic oil tanks has drawbacks in aspect of pressure withstanding and deformation resisting properties of oil fuel tanks compared with metal materials, so it has disadvantages for being applied in fields such as high pressure resistance etc. For example, the deformation resistance of plastic oil fuel tank in the conventional resistance against the action of oil fuel gravity deformation and infiltrating-aging. Moreover, the ability to withstand high pressure deformation is required in some special engineering fields where the interior of oil fuel tank should maintain a high pressure, such as the oil fuel tank of the plug-in hybrid electric vehicle. Generally, plug-in hybrid electric vehicles and extended-range electric vehicles are merely driven by electric motors, and the engine does not operate for a long time. As temperatures change between day and night and the heat exchange inside the oil fuel tank, oil fuel in the oil fuel tank, such as gasoline and diesel will produce a relatively high oil fuel vapor pressure due to a relatively large change of temperature difference. In some cases, a relatively high air pressure will be established inside the oil tank, which may go up to a high pressure of 40 kPa and down to a negative pressure of −20 KPa. Thus, the current solution is to use an oil tank that may withstand a pressure of 40 KPa to prevent the continuous discharge of oil vapor to the carbon canister which causes saturation of the carbon canister and prevent liquid fuel from leaking to the outside environment which causes hydrocarbon (HC) emission pollution and even the risk of fire. Since there are high requirements for the sealing and safety of the oil tank in the entire industry, and the above mentioned problems have not been well resolved, metal oil tanks are usually used in the prior art to meet the requirement of withstanding high pressure. However, since metal tank has the characteristics of poor corrosion resistance, heavy weight, and low degree of freedom in design, it cannot be well applied in the field of fuel tanks which should be able to withstand high pressure. Alternatively, in the prior art, partial regions of the upper and lower surfaces of a plastic parison are extruded for a connection by using mold in the blow molding process, which is commonly known as the KISS-OFF structure. Such structure has a low connection strength and a large amount of rated capacity of the oil tank is sacrificed, such that it has low economic efficiency. Therefore, there is an urgent need for a new technical solution to solve this technical problem and to achieve the relevant technical requirements for withstanding high pressure, providing sealing performance, and safety performance of the oil tank.

SUMMARY

The present invention precisely addresses the technical problems existing in the prior art and provides a rigid connector for the upper and lower surfaces inside an oil tank and a production method of the oil tank. The technical solution overcomes the defects in the prior art and provides a plastic oil tank which can withstand high pressure.

In order to achieve the above-mentioned objectives, the technical solution of the present invention is as follows. A rigid connecting device for connecting the upper and lower surfaces inside an oil tank is characterized in that the connecting device includes a connecting rod, an upper side and a lower side of the connecting rod are both provided with a connecting end surface. The connecting end surface is provided with a material-passing-hole to ensure a good connection between HDPE and the connecting end surface during a later injection-molding rubber-coating process and prevent the HDPE from detaching from the connecting end surface under the action of a pulling force. An outer surface of the rigid connecting device is covered with high density polyethylene. The connecting rod is cylinder-shaped, cuboid-shaped, or is a cylinder with a certain curvature in the middle, the shape may be selected according to the actual condition of the oil tank. The connecting rod is fixed with the connecting end surface through welding or screwing. With this arrangement, maximal connecting strength and reliability can be obtained while a limited space of the interior of the oil tank would be occupied as less as possible. The connecting end surfaces of two sides of the connecting rod are round-shaped, quadrilateral-shaped, ellipse-shaped, or have other shapes, and the connecting end surfaces on two sides may have the same size or different size. In practical applications, the connecting end surface of the side connected to a molten parison is configured with a properly larger size so as to optimize the connection. Since the connecting end surface is configured to connect with two molten parisons of the oil tank, the shape and size of the connecting end surface should be selected according to the actual situation. The outer surface of the rigid connecting device is covered with high density polyethylene, so as to realize a high-strength connection between the two parisons. The entire technical solution is designed with ingenious structure, lower cost and the requirements for the oil tank to withstand high pressure strength are satisfied.

As an improvement of the present invention, at least one of a material-overflowing air vent and a fixing hole is arranged on the connecting end surface. The arrangement of the material-overflowing air vent on the connecting end surface is for the purpose of exhausting air and overflowing materials during the process of connecting the connecting end surface and the molten parison after a rubber-coating, so as to reduce the resistance of connection with the inner wall of the oil tank and improve the connection performance.

Meanwhile, the fixing hole is also provided on the connecting end surface so that a protruding structure added on the mold may be inserted into the fixing hole in a part connection, so as to achieve a tight fitting among the parts, the molten parison of the oil tank, and the mold, and prevent the rigid connector from sagging or even detaching thereby causing an inclination of the connection position or even a reduction of the connection performance.

As an improvement of the present invention, a cover plate is arranged above the fixing hole. The cover plate is provided with a weld line. The material of the cover plate is high density polyethylene, so as to ensure that the weld line is of a butt-fusion joint with the parison of the oil tank in the same materials. In this technical solution, a cover plate structure is assembled and connected which covers the fixing hole structure. When the protrusion of the mold extrudes the parison to the fixing hole, the molten parison contacts the weld line of the cover plate under the extrusion of the protrusion of the mold to realize the butt-fusion joint between the molten parison and the weld line of the cover plate, so as to further prevent the sagging and even detachment of the rigid connector, and thus optimize the quality of connection. Meanwhile, the molten parison spreads around the hole under the extrusion of the cover plate, so that an anti-pull structure is formed after cooling which can further increase the connection strength.

As an improvement of the present invention, the connecting rod is provided with a reinforcing rib, and at least one reinforcing rib is provided, so as to improve the performance of withstanding high pressure of the connecting device.

As an improvement of the present invention, the end surface of the rubber-coated connecting device is provided with high density polyethylene which forms a pock-like protruding structure. The rubber-coated connecting end surface is made of HDPE material, and there are a plurality of pock-like protruding structures made of HDPE material for a butt-fusion joint between the pocks on the end surface at one side and the molten parison on the mold at one side under the extrusion of a clamping mechanism during a blow molding process. The butt-fusion joint connection between the pock-like protruding structure on the end surface at the other side and the molten parison on the mold at the other side can be achieved through a mold-closing of the mold in a mold-closing process of the mold performed in the end, so as to ensure the reliability of the connection between the rigid connecting device and two parisons.

As an improvement of the present invention, the connecting rod is a metal connecting rod, a high-strength engineering plastic connecting rod, a stamped metal connecting rod, an injection-molded high-strength engineering plastic connecting rod, or an injection-molded high-strength reinforced connecting rod. The material thereof includes high density propylene (HDPR), polyformaldehyde (POM), polyamid (PA) or engineering plastics.

A production method of an oil tank configured with a rigid connecting device is characterized in that the method includes the following steps:
1) unloading two parisons, wherein the two unloaded parisons are respectively placed at an intermediate position between two molds and a preforming mold plate;
2) closing a half-mold and the preforming mold plate;
3) performing high-pressure blow molding in an interior to preform two shell bodies;
4) opening the mold and removing the preforming mold plate;
5) moving in an assembly built-in mechanism to perform a connection of built-in assemblies, and connecting an end surface of a side of the rigid connecting structure to an inner wall of a preformed parison at a side;
6) removing the assembly built-in mechanism;
7) closing the mold for a second time, wherein the extrusion during the mold closing is used to realize a connection between the other end surface of the rigid connecting structure and an interior of the other side of the parison; and forming a hollow box body through a high-pressure blow molding; and
8) opening the mold and taking out the product.

As an improvement of the present invention, in the above mentioned step 5, the specific operations of the step of connecting the end surface of a side of the rigid connecting structure to an inner wall of the preformed parison at a side are as follows. A plurality of pock-like protruding structures made of HDPE are formed on the end surfaces of the rubber-coated connecting structure, and the assembly built-in mechanism connects the end surface of a side of the rigid connecting structure to the inner wall of the preformed parison at a side. Meanwhile, the protrusions of the mold extrudes the parison to the fixing hole on the connecting end surface. The molten parison contacts the weld line of the cover plate under the extrusion of the mold protrusions to achieve a butt-fusion jointing between the molten parison and the weld line on the cover plate, so as to prevent the rigid connector from sagging or even detaching in a further step. Moreover, the molten parison spreads around against the fixing hole under the extrusion of the cover plate, such that an anti-pull-structure is formed after cooling down, thereby realizing the connection between the end surface of a side of the rigid connecting structure and an inner wall of the preformed parison at a side.

Compared with the prior art, the advantages of the present invention are as follows. 1) In such technical solution, the rigid connecting device has an ingenious and compact structural design, a higher degree of freedom in appearance design, and can satisfy the performance requirement for the oil tank to withstand high pressure. 2) The connection between the upper and lower surfaces of the oil tank is achieved through the connecting rod, by applying such arrangement in partial areas of the oil fuel tank where the rigidity is poor, there are more effective space compared to KISS-OFF. 3) The part of the rigid connecting rod contacting with the oil fuel is made of high density polyethylene instead of other engineering plastics or metals, so the requirements of strength and anti-corrosion can be satisfied. 4) The connection method of two-piece parison is used to connect the rigid connecting rod to the inner wall of the oil tank by a method of butt-fusion joint. The heat of the parison itself is fully used, so the energy is effectively used. 4) This technical solution has good economic efficiency and manufacturing feasibility, while the requirements of high rigidity for oil tank are satisfied. 5) With this technical solution, not only the requirement of preventing 40 KPa positive-pressure deformation inside the oil tank can be satisfied, but also the rigid connecting device can greatly satisfy the requirement of withstanding −20 KPa negative pressure, so the application range is wide. 6) This technical solution can reduce the cost reasonably and is convenient for large-scale promotion and application.

BRIEF DESCRIPTION OF THE DRAWING

FIG. 4-1 is a partial enlarged view of FIG. 4;

Among them: 1, connecting rod, 2, connecting end surface, 3, material-passing hole, 4, fixing hole, 5, material-overflowing air vent, 6, HDPE pock-like structure; 7, reinforcing rib, 8, weld line, 9, cover plate, 10, half mold, 11, preforming mold plate, 12, oil tank, 13, clamping tool, 14, assembly built-in mechanism, 15, cover plate snapping groove, 16, cover plate assembling hole, 17, internally injection-molded high-strength reinforced part, 21, connecting end surface after injection-molding and rubber-coating.

DETAILED DESCRIPTION OF THE EMBODIMENTS

For a further cognition and understanding of the present invention, the present invention will be further described below with reference to the drawings and specific embodiments.

Embodiment 1

Referring to FIG. 1 to 4, a rigid connecting device for connecting the upper and lower surfaces inside an oil tank is provided. The connecting device includes connecting rod 1. The upper and lower sides of the connecting rod are each provided with a connecting end surface 2. The connecting surface 2 is provided with material-passing-holes 3 in interest of realizing a good connection between HDPE and the connecting end surface during the subsequent injection molding and rubber coating process, so as to prevent detachment of the HDPE from the connecting end surface under the action of the pulling force. The outer surface of the rigid connecting device is covered with high density polyethylene which is also called HDPE for short. The connecting rod 1 is cylinder-shaped, cuboid-shaped, or a cylinder with a certain radian in the middle, the shape is selected according to the actual conditions of the oil tank. The connecting rod is fixed to the connecting end surface 2 by welding or screwing. With this arrangement, the maximal connecting strength and reliability can be obtained while the limited space within the oil tank may be occupied as less as possible. The connecting end surfaces 2 on both sides of the connecting rod 1 are round-shaped, quadrangle-shaped, ellipse-shaped, or has other shapes. The connecting end surfaces 2 on both sides can be configured with the same size or different sizes. In practical applications, generally, the size of the connecting end surface of the side connected to the molten parison is configured with a properly larger size, so as to optimize the connection. Since the connecting end surfaces are configured to connect with two molten parsions of oil tank the, the shape and size of the connecting end surfaces need to be selected according to the actual situation. The outer surface of the rigid connecting device is covered with high density polyethylene, so a high-strength connection between the two parisons can be achieved. The entire technical solution is designed with ingenious structure and lower cost, and the requirements of withstanding high pressure for the oil tank can be satisfied.

Embodiment 2

Figure 1:
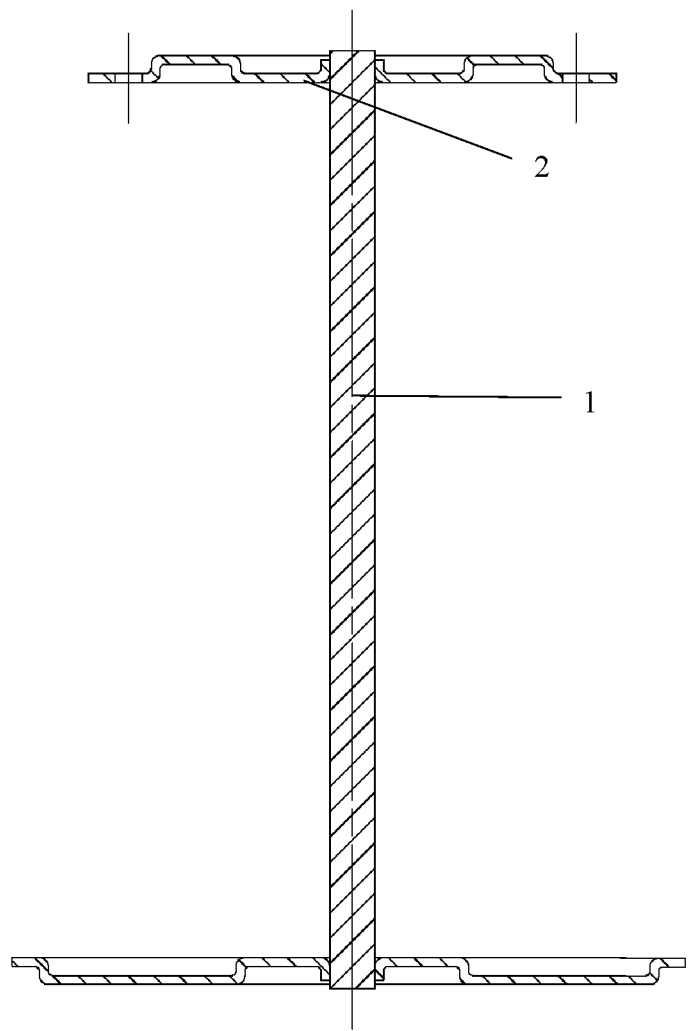
FIG. 1 is a structural schematic diagram of a metal or high-strength engineering plastic rigid connecting device of the present invention.
Figure 2:
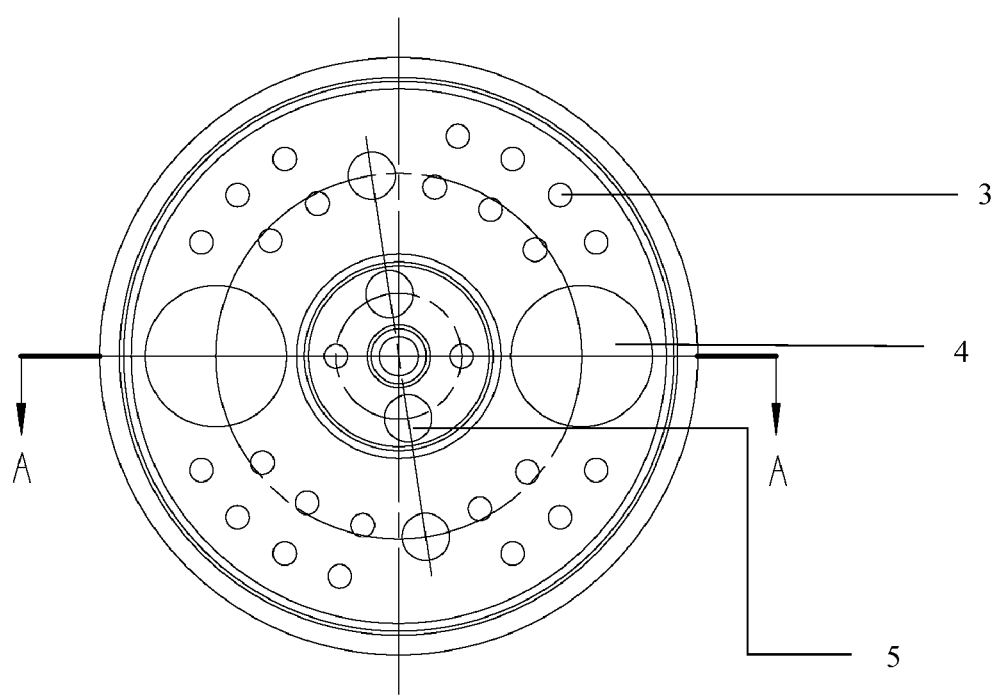
FIG. 2 is a structural schematic diagram of a metal or high-strength engineering plastic reinforced end surface of the present invention.
Figure 3:
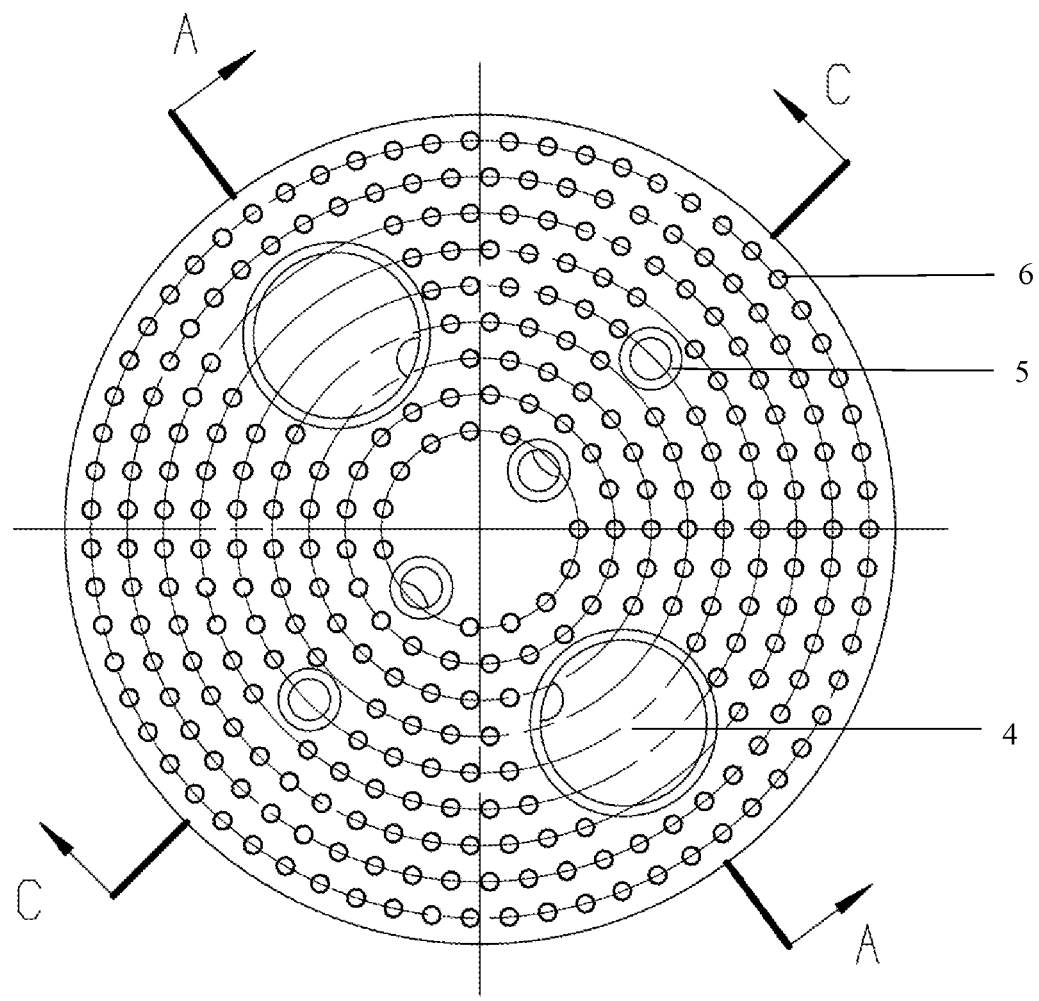
FIG. 3 is a structural schematic diagram of an end surface of a metal or high-strength engineering plastic after injection-molded and rubber-coated with HDPE of the present invention.

Referring to FIGS. 1 to 4, as an improvement of the present invention, the connecting end surface is provided with at least one of the material-overflowing air vent 5 and the fixing hole 4. Referring to FIG. 2, the connecting end surface 2 is provided with material-overflowing air vent 5. The rubber-coated structure is shown in FIG. 3. The rubber-coated material-overflowing air vent 5 plays a role of gas-exhausting and material-overflowing during the process of connecting the connecting end surface and the molten parsion after the rubber-coating, such that the resistance to connect with the inner wall of the oil tank is reduced, and the connection is improved. Synchronously, the connecting end surface is provided with fixing hole 4 for adding a protruding structure on the mold, so when the parts are connected the protruding structure would be inserted into the fixing hole 4. The structural diagram after rubber-coating is shown in FIG. 3. FIG. 3 shows the rubber-coated fixing hole 4, and a tight fitting among the parts, the molten parsion of the oil tank, and the mold can be realized, thereby preventing an inclination of the connecting position and even reduction of connection performance due to the drooping and even detaching of the rigid connector. FIG. 3 is a structural schematic diagram of the rubber-coated connecting end surface, wherein the HDPE pock-like structure is formed on the rubber-coated connecting end surface, and the rubber-coated material-overflowing air vent 5 and the rubber-coated fixing hole 4 can be seen on the connecting end surface.

Embodiment 3

Figure 4:
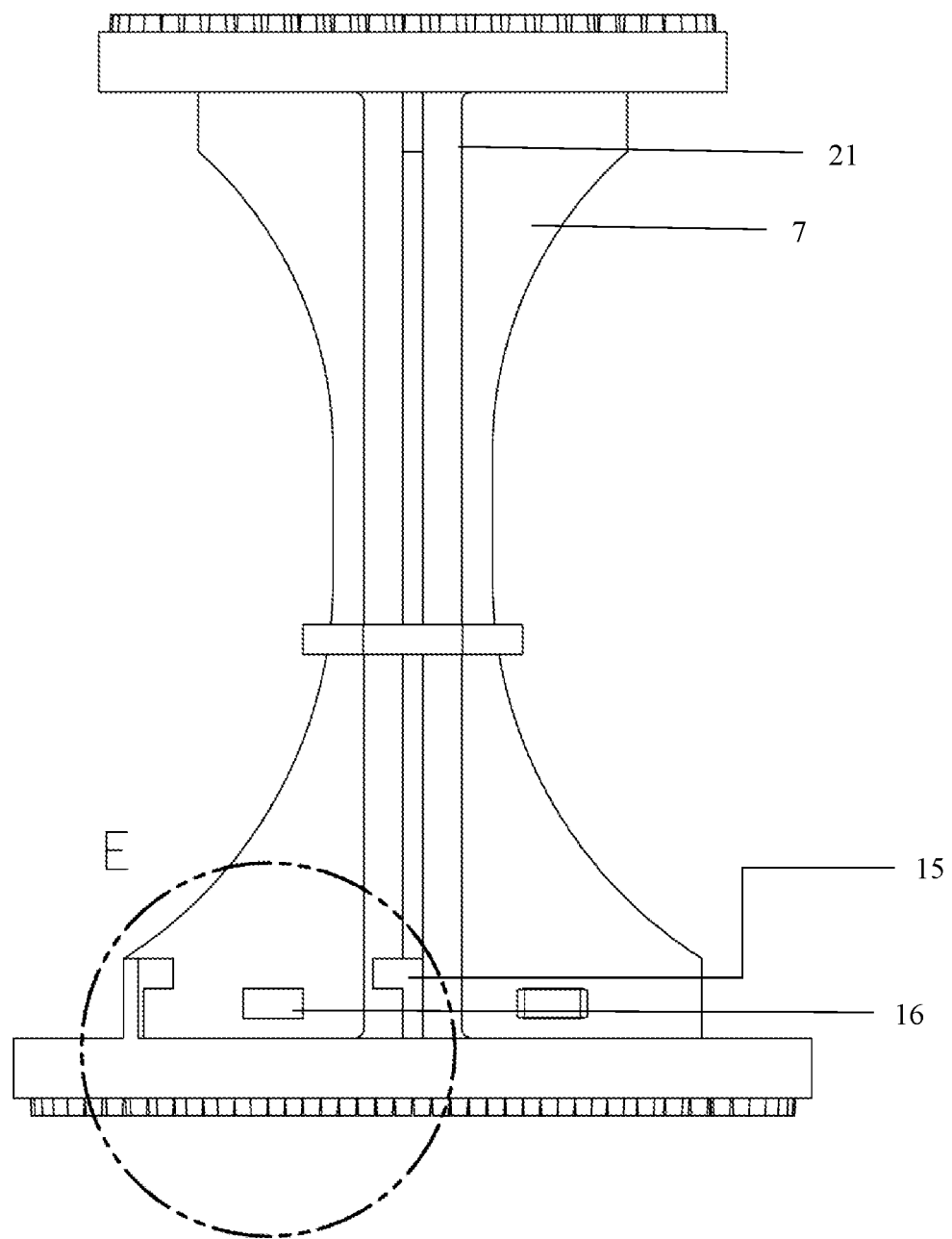
FIG. 4 is an overall structural schematic diagram of a metal or high-strength engineering plastic after injection-molded and rubber-coated with HDPE of the present invention.
Figures 1, 4:
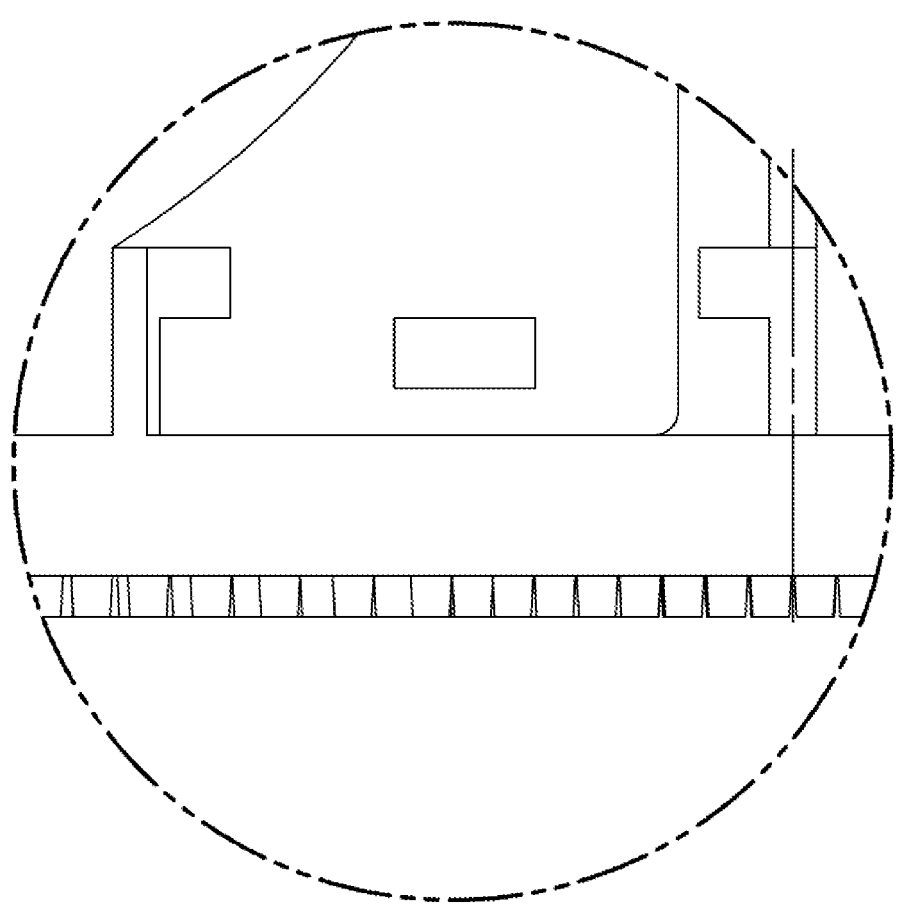
Figure 5:
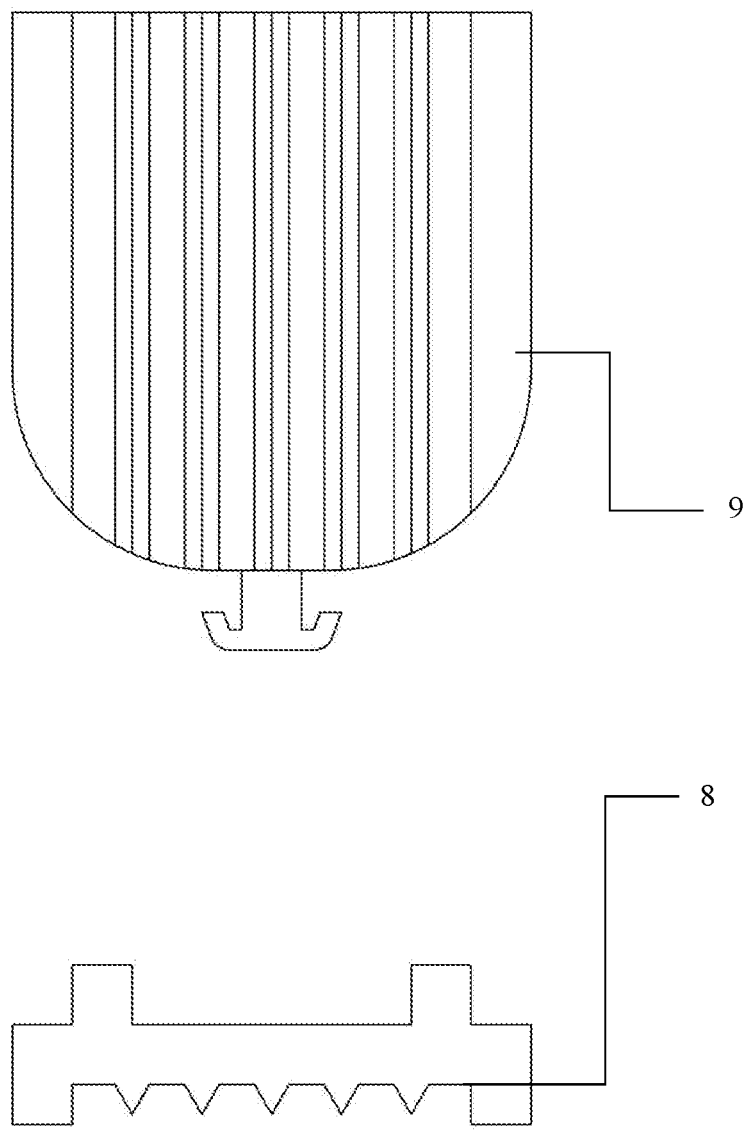
FIG. 5 is a structural schematic diagram of a cover plate structure assembled above a fixing hole.

Referring to FIG. 4, FIG. 4-1 and FIG. 5, as an improvement of the present invention, a cover plate 9 is provided above the fixing hole 4, and the cover plate 9 is provided with weld line 8. A side of the cover plate 9 may be assembled into the cover plate assembling hole 16 by using a T-shaped structure. Synchronously, the cover plate snapping groove 15 is used to fix both sides of the cover plate to ensure the fixing of the cover plate on the rigid connecting device. In the technical solution, a cover plate 9 structure is assembled, connected, and covered above the fixing hole 4 structure. When the mold protrusion extrudes the parison until the fixing hole, the molten parison contacts the weld line of the cover plate under the extrusion of the mold protrusion, so that the butt-fusion joint between the molten parsion and weld line on the cover plate is realized, thereby preventing the sagging and even detaching of the rigid connector and optimizing the connection quality. Synchronously, the molten parison spreads around the hole under the extrusion of the cover plate, so an anti-pull structure is formed after cooling, thereby further improving the connecting strength.

Embodiment 4

Referring to FIG. 4, as an improvement of the present invention, the connecting rod 2 is provided with reinforcing rib 7, and at least one reinforcing rib 7 is provided for uniformly exerting the force applied on the connecting rod to the connecting end surface, so a failure caused by the excessive locally applied force on the connecting end surface is prevented, and the high-pressure withstanding performance of the connecting device is further improved.

Embodiment 5

Referring to FIG. 3, as an improvement of the present invention, the end surfaces of the rubber-coated connecting device is provided with a high-density polyethylene pock-like protruding structure 6 which is referred to as HDPE pock-like structure. The rubber-coated connecting end surface is made of HDPE material which has a plurality of HDPE pock-like protruding structures for butt-fusion jointing the pocks on the end surface of one side to the molten parsion of the mold at one side under an extrusion of a clamping mechanism during the blow molding process. Such connection can be realized by using the heat of the parison itself, and the butt-fusion joint between the pocks on the end surface of the other side and the molten parsion of the mold at the other side can be realized by the closing of the molds during the mold closing process at the end, so the reliability of connection between the rigid connecting device and the two parisons is ensured.

Embodiment 6

Figure 6:
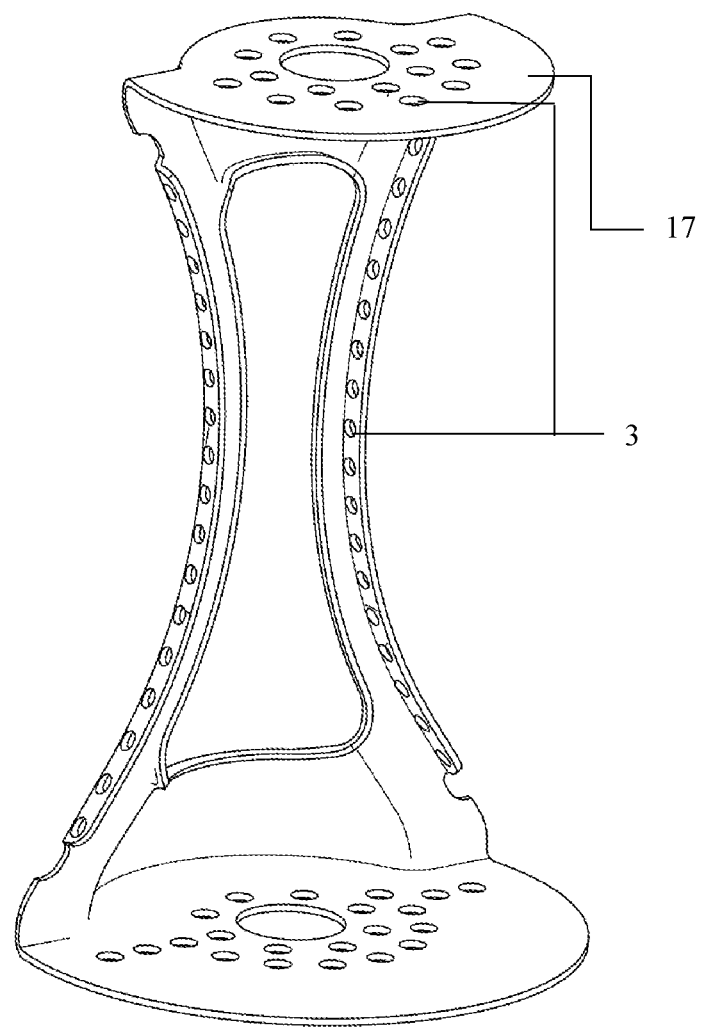
FIG. 6 is a structural schematic diagram of a rigid connecting device made of a stamped metal or injection-molded high-strength engineering plastic of the present invention.
Figure 7:
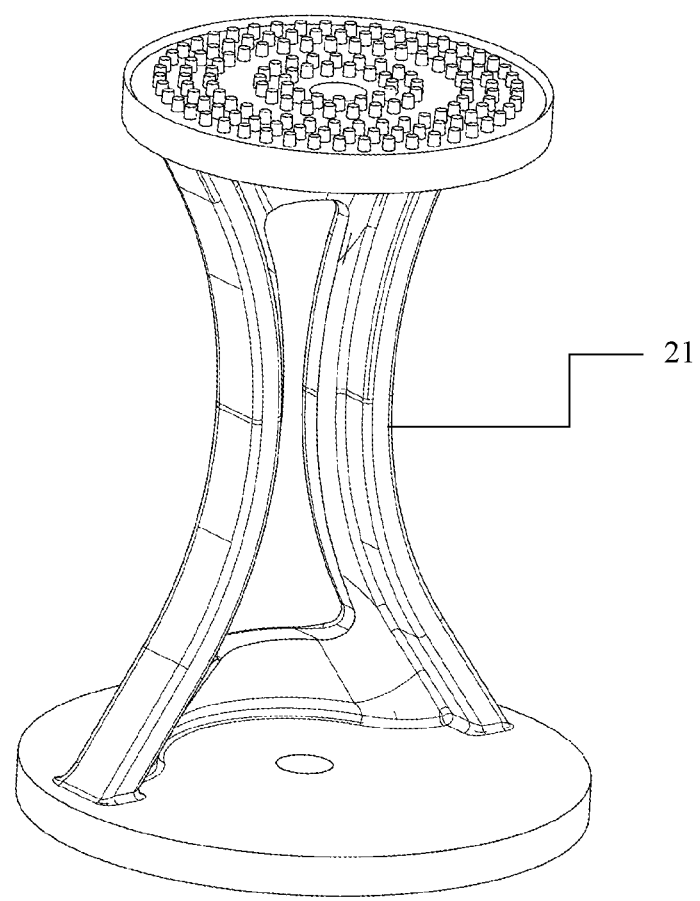
FIG. 7 is a schematic diagram of an injection-molding and rubber-coating structure of a connecting device made of a stamped metal or injection-molded high-strength engineering plastic of the present invention.
Figure 8:
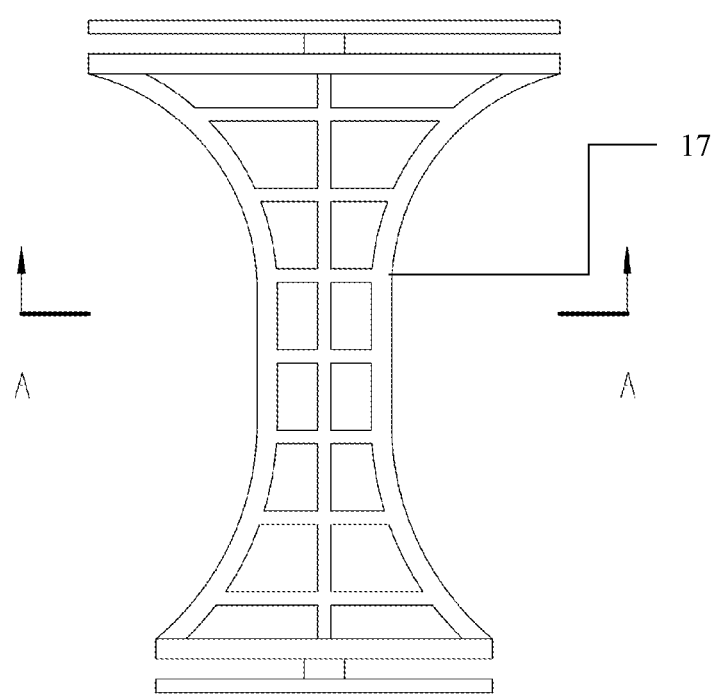
FIG. 8 is an overall structural schematic diagram of an internally injection-molded high-strength reinforced part of the present invention.
Figure 9:
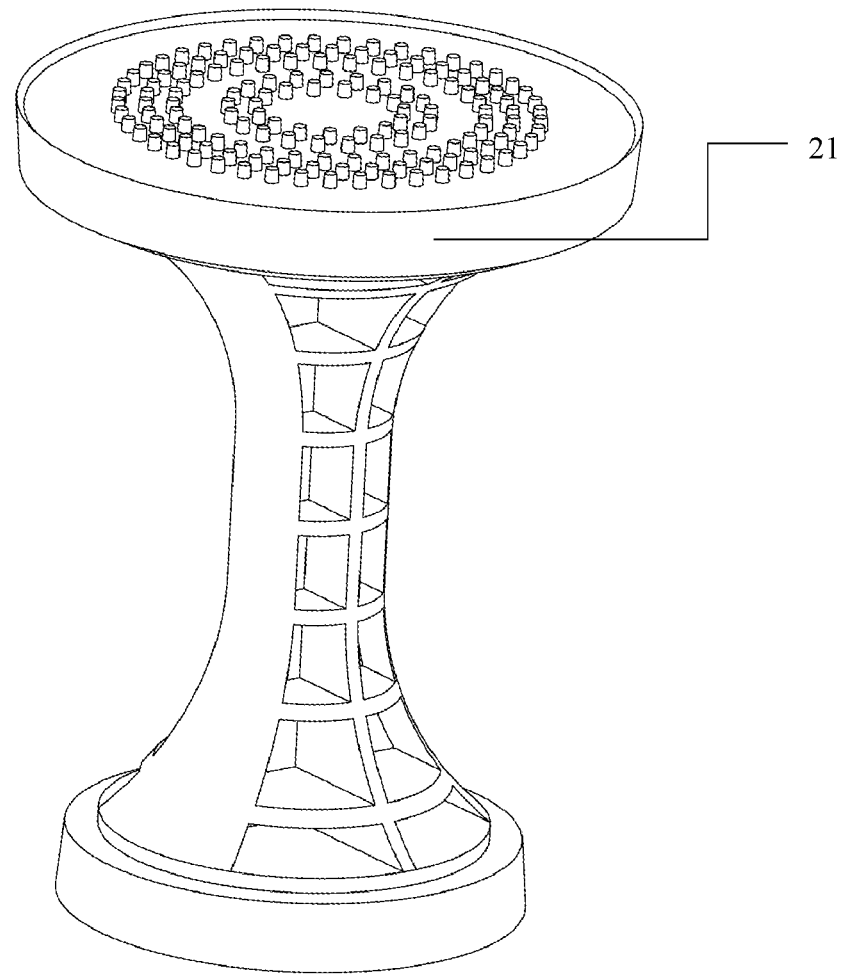
FIG. 9 is a schematic diagram of an injection-molding and rubber-coating structure of an internally injection-molded high-strength reinforced part of the present invention.

As an improvement of the present invention, referring to FIG. 1 and FIG. 2, the connecting rod is a metal connecting rod or a high-strength engineering plastic connecting rod. Referring to FIG. 6 and FIG. 7, the connecting rod is a stamped metal connecting rod or an injection-molded high-strength engineering plastic connecting rod. Referring to FIG. 8 and FIG. 9, the connecting rod is an injection-molded high-strength reinforced part, and its material includes HDPR, POM, PA or other engineering plastics.

Embodiment 7

Figure 10:
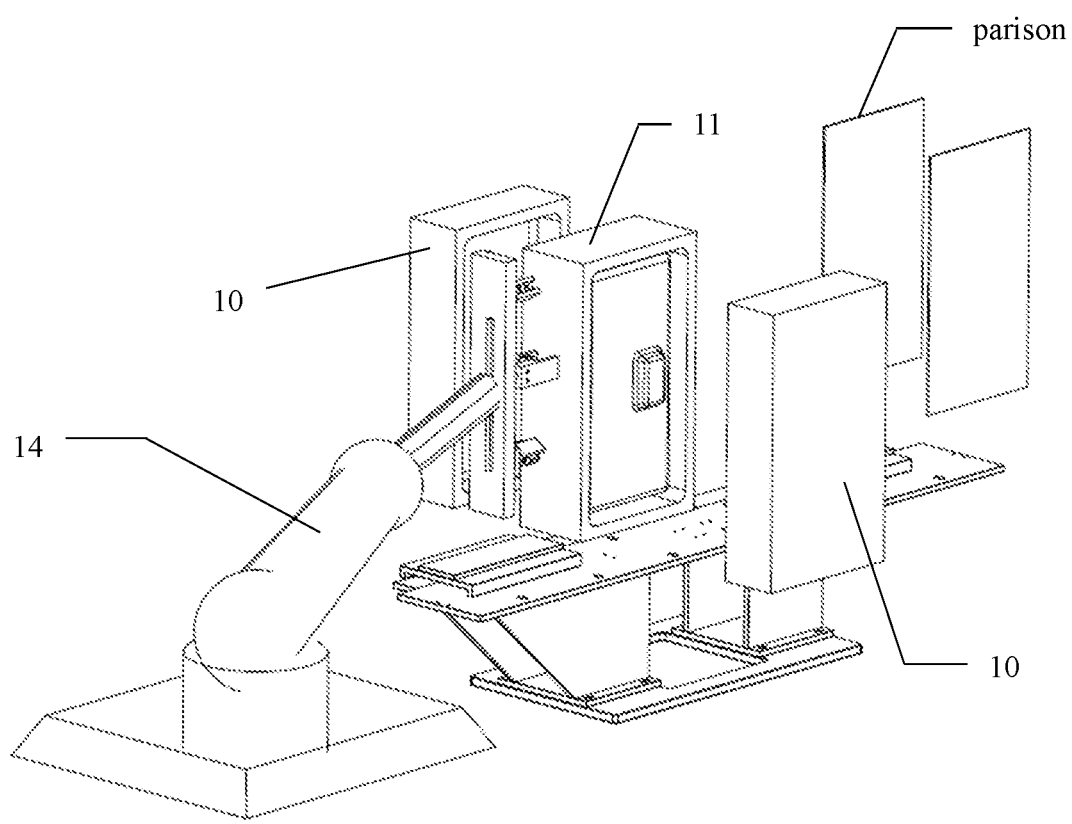
FIG. 10 is a schematic diagram of an unloading state of two parisons.

Referring to FIG. 10 to FIG. 15, a production method of an oil tank provided with a rigid connecting device includes the following steps. 1) Two parisons are unloaded, and the two unloaded parisons are respectively placed in intermediate positions between two half molds 10 and the preforming mold plate 11 as shown in FIG. 10.

Figure 11:
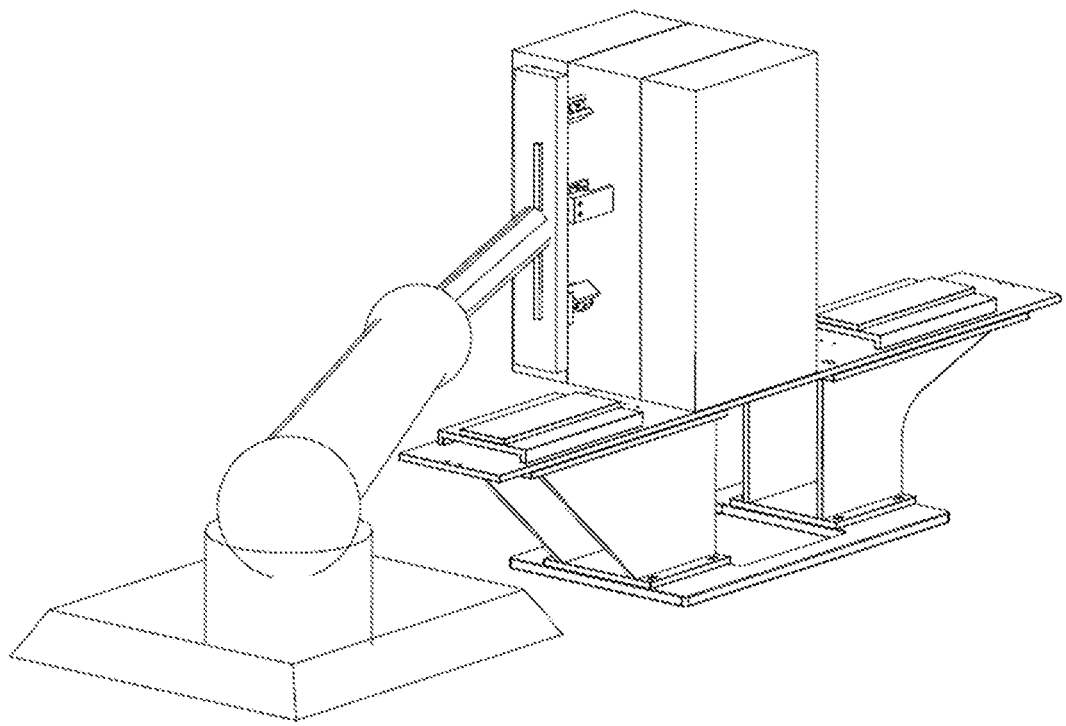
FIG. 11 is a schematic diagram of the first closed state of two half molds.

2) As shown in FIG. 11, the half molds 10 and the preforming mold plate 11 are closed. In this step, the half molds on both sides simultaneously move toward the preformed mold plate in the middle.

3) Internal high-pressure blow molding is performed to preform two shell bodies. In this step, two molten parisons are respectively fit with the cavity of the half molds closely, so as to realize the preformation of the inner wall structure of the oil tank.

Figure 12:
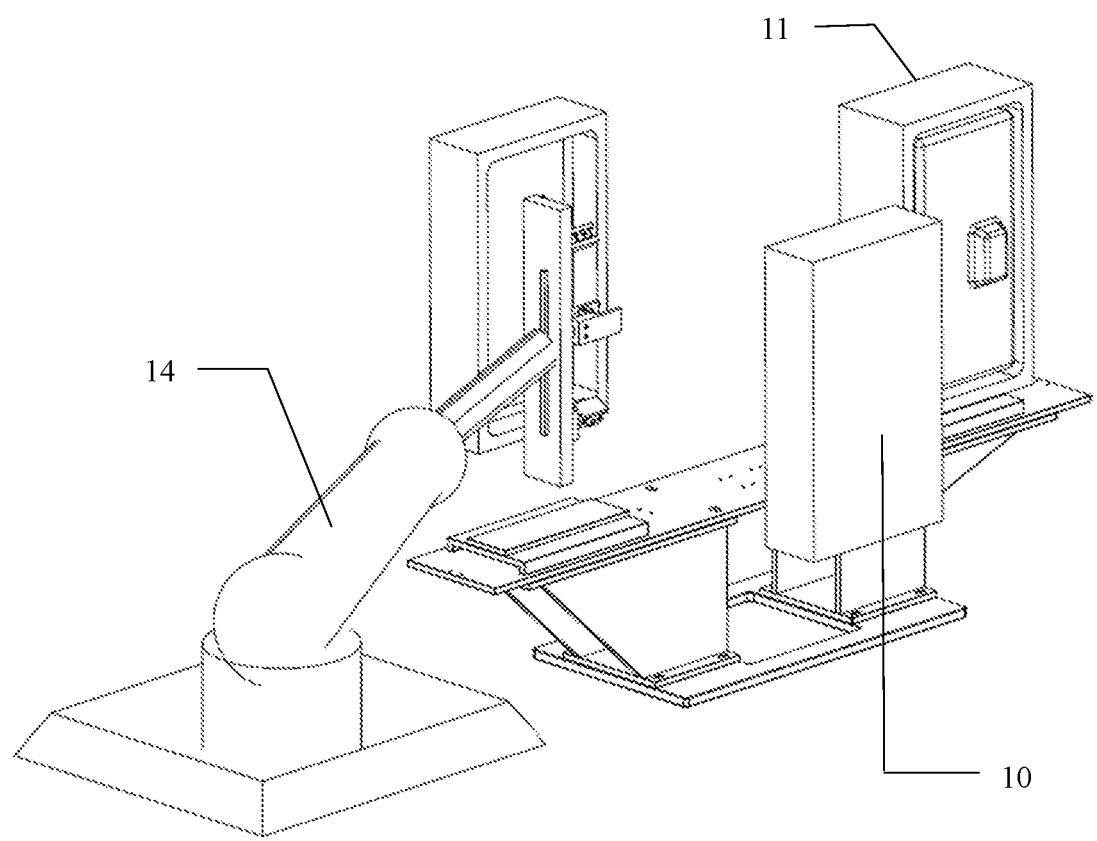
FIG. 12 is a schematic diagram of a removing state of a preforming mold plate.

4) As shown in FIG. 12, the half molds 10 are opened and the preformed mold plate 11 is removed.

Figure 13:
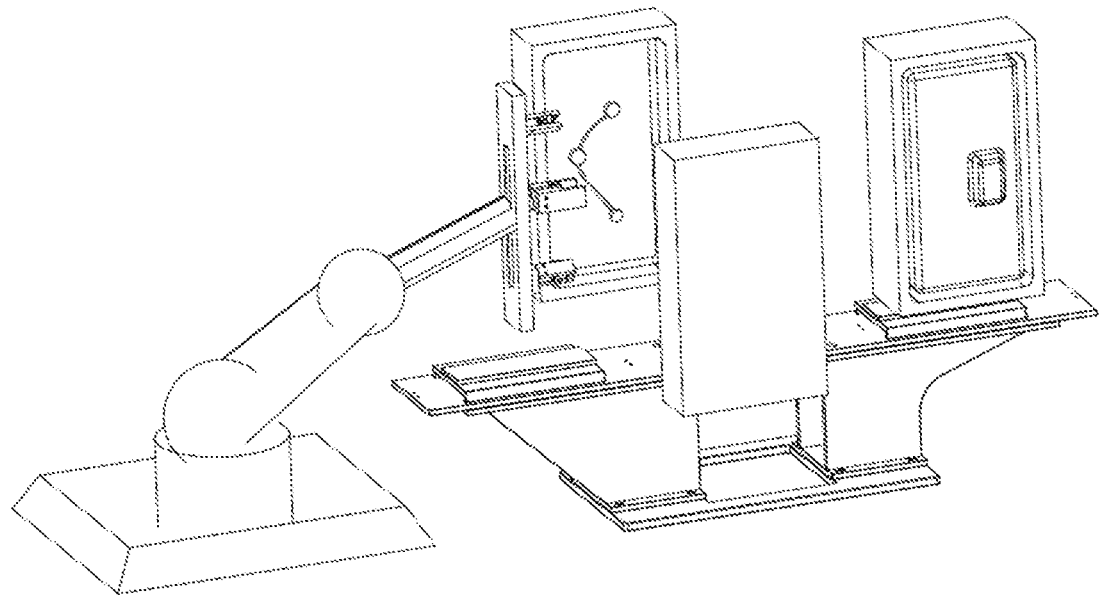
FIG. 13 is a state diagram showing that an assembly is internally arranged and a rigid connecting structure is connected to a parison at one side.
Figure 14:
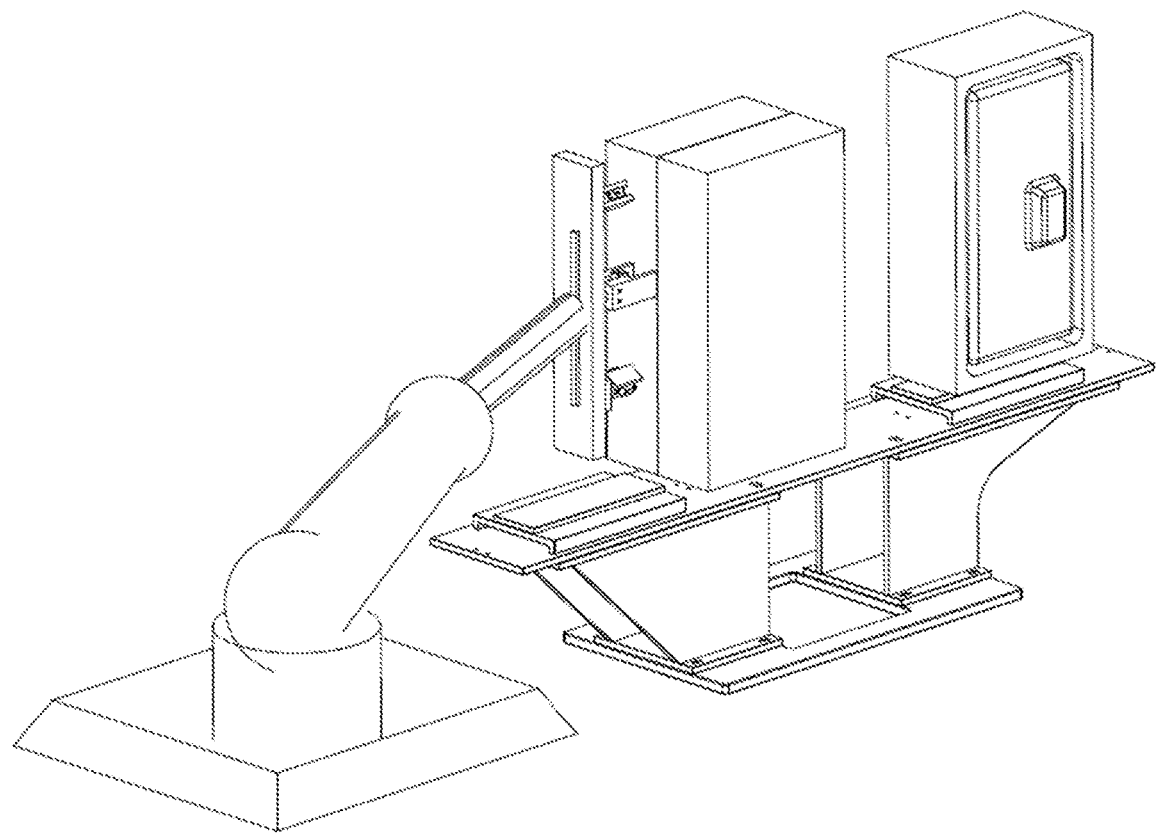
FIG. 14 is a state schematic diagram showing a reclosing of the half molds.
Figure 15:
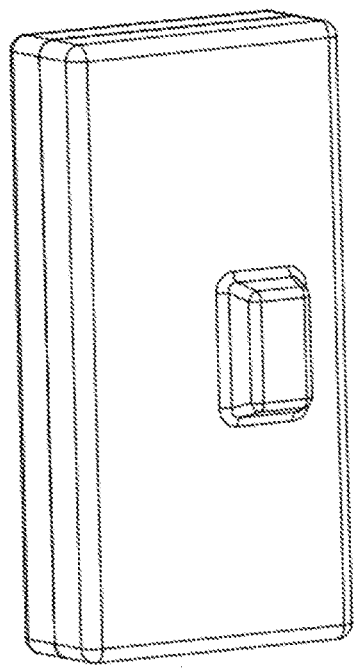
FIG. 15 is a structural schematic diagram of a produced oil tank.

5) As shown in FIG. 13, the assembly built-in mechanism is moved in to perform built-in assembly connection. The built-in parts needed in the oil tank are fixed on the inner wall of the cavity by the mechanical arm. Meanwhile, the end surface of one side of the rigid connecting structure is connected to the inner wall of preformed parison at one side. In this step, the built-in assembly is fixed, and the connecting end surface of one side of the connecting device is fixed to the parison at one side.

6) As shown in FIG. 13, when the built-in assembly is fixed and the rigid connecting device is fixed on the parison at one side, the assembly built-in mechanism is removed.

7) The molds are closed at the second time. The connection between the other end surface of the rigid connecting structure and the interior of the parison at the other side are realized by using the extrusion during the mold closing. Moreover, the hollow box body is formed by high-pressure blow molding.

8) The molds are opened and the product is taken out.

As an improvement of the present invention, in the step 5, the specific operations of the step of connecting the end surface of one side of the rigid connecting structure to the inner wall of the preformed parsion at one side are as follows. A plurality of HDPE pock-like protruding structures are formed on the end surface 21 of the rubber-coated connecting structure. The assembly built-in mechanism connects the end surface of one side of the rigid connecting structure to the inner wall of the preformed parison at one side. Meanwhile, the mold protrusions extrude the parison until the fixing hole 4 on the connecting end surface. The molten parison contacts the weld line 8 of the cover plate 9 under the extrusion of the mold protrusions so the butt-fusion joint between the molten parison and the weld line on the cover plate is realized, and a sagging or detaching of the rigid connector can be prevented. Simultaneously, the molten parison spreads around the fixing hole under the extrusion of the cover plate, and an anti-pull structure is formed after cooling, so the connection between the end surface of one side of the rigid connecting structure and the inner wall of the preformed parison at one side can be realized.

The present invention can also combine at least one of the technical features described in Embodiments 2, 3, 4, 5, 6 with Embodiment 1 to form a new embodiment.

It should be noted that the above mentioned embodiments are merely preferred embodiments of the present invention rather than limiting the scope of the present invention. Any equivalent replacement or substitution derived based on the above mentioned technical solution should fall within the protection scope of the present invention.

We claim:

1. A rigid connecting device for connecting an upper surface and a lower surface inside tank comprising a connecting rod, wherein an upper side and a lower side of the connecting rod are each fixed to a connecting end surface;

each connecting end surface is provided with a material-passing-hole;

an outer surface of the rigid connecting device is covered with high-density polyethylene, wherein the each connecting end surface is provided with at least one of a material-overflowing air vent and a fixing hole.

2. The rigid connecting device for connecting an upper surface and a lower surface inside tank according to claim 1, wherein a cover plate is arranged above the fixing hole;

the cover plate is provided with a weld line; and the cover plate is made of a material of high density polyethylene.

3. The rigid connecting device for connecting an upper surface and a lower surface inside an oil tank according to claim 2, wherein the connecting rod is provided with a reinforcing rib.

4. The rigid connecting device for connecting an upper surface and a lower surface inside an oil tank according to claim 3 wherein the each connecting end surface of the rigid connecting device is provided with a plurality of high-density polyethylene pock-like protruding structures.

5. The rigid connecting device for connecting an upper surface and a lower surface inside tank according to claim 2 wherein the each connecting end surface of the rigid connecting device is provided with a plurality of high-density polyethylene pock-like protruding structures.

6. The rigid connecting device for connecting an upper surface and a lower surface inside an oil tank according to claim 1, wherein the each connecting end surface of the rigid connecting device is provided with a plurality of high-density polyethylene pock-like protruding structures.

7. The rigid connecting device for connecting an upper surface and a lower surface inside an oil tank according to claim 6, wherein the each connecting end surface is configured with a shape selected from the group consisting of round, quadrangle, ellipse and irregular shape.

8. The rigid connecting device for connecting an upper surface and a lower surface inside an oil tank according to claim 7, wherein the connecting rod is one item selected from the group consisting of metal connecting rod, high-strength engineering plastic connecting rod, stamped metal connecting rod, injection-molded high-strength engineering plastic connecting rod, and injection-molded high-strength reinforced connecting rod.

9. The rigid connecting device for connecting an upper surface and a lower surface inside an oil tank according to claim 7, wherein the connecting rod is fixed to the each connecting end surface by welding or screwing.

10. The rigid connecting device for connecting an upper surface and a lower surface inside tank according to claim 6, wherein the connecting rod is fixed to the each connecting end surface by welding or screwing.

11. A production method of tank provided with a rigid connecting device according to claim 1 comprising unloading two parisons, wherein the two parisons are respectively placed in an intermediate position between two half molds and a preforming mold plate;

closing a plurality of half molds and the preforming mold plate;

performing internal high-pressure blow molding to preform two shell bodies;

opening the plurality of half molds and removing the preforming mold plate;

moving in an assembly built-in mechanism to perform a built-in assembly connection, meanwhile, connecting a first end surface of a first side of the rigid connecting structure to an inner wall of a first preformed parison at a side;

moving out the assembly built-in mechanism;

closing the plurality of half molds for a second time, wherein an extrusion of the plurality of half molds in the closing is used to realize a connection between a second end surface of the rigid connecting structure and an interior of a second preformed parison at another side, synchronously, forming a hollow body by a high-pressure blow molding; and opening the plurality of half molds and taking out a product.

12. The production method of tank provided with a rigid connecting device according to claim 11, wherein specific operations of the step of connecting the first end surface of the first side of the rigid connecting structure to the inner wall of the first preformed parison at the side are as follows:

forming a plurality of HDPE pock-like protruding structures on an end surface of a rubber-coated connecting structure;

an assembly built-in mechanism connecting the first end surface of the first side of the rigid connecting structure to the inner wall of the first preformed parison at the side;

synchronously, a plurality of protrusions of the plurality of half molds extruding a molten parison until a fixing hole on the each connecting end surface, wherein the molten parison contacts a weld line of the cover plate under an extrusion of the plurality of protrusions of the plurality of half molds, so as to achieve a butt-fusion joint between the molten parison and the weld line on the cover plate and further prevent the rigid connector from sagging or even detaching, and the molten parison spreads around the fixing hole under the extrusion of the cover plate, so an anti-pull structure is formed after a cooling, and the first end surface of the first side of the rigid connecting structure is connected to the inner wall of the preformed parison at the side.

13. The production method of tank provided with a rigid connecting device according to 11 wherein, the each connecting end surface is provided with at least one of a material-overflowing air vent and a fixing hole.

14. The production method of tank provided with a rigid connecting device according to 13 wherein, a cover plate is arranged above the fixing hole;

the cover plate is provided with a weld line; and the cover plate is made of a material of high density polyethylene.

15. The production method of tank provided with a rigid connecting device according to 14 wherein, the connecting rod is provided with a reinforcing rib.

16. The production method of tank provided with a rigid connecting device according to 13 wherein, the each connecting end surface of the rigid connecting device is provided with a plurality of high-density polyethylene pock-like protruding structures.

17. The production method of tank provided with a rigid connecting device according to 16 wherein, the each connecting end surface is configured with a shape selected from the group consisting of round, quadrangle, ellipse and irregular shape.

18. The production method of tank provided with a rigid connecting device according to 17 wherein, the connecting rod is one item selected from the group consisting of metal connecting rod, high-strength engineering plastic connecting rod, stamped metal connecting rod, injection-molded high-strength engineering plastic connecting rod, and injection-molded high-strength reinforced connecting rod.

19. The production method of an oil tank provided with a rigid connecting device according to 16 wherein, the connecting rod is fixed to the each connecting end surface by welding or screwing.

* * * * *